Patented Apr. 5, 1938

2,113,375

UNITED STATES PATENT OFFICE 2,113,375

CALCIUM SULPHATE PLASTER

Francis Robert Himsworth and John Stanley Dunn, Norton-on-Tees, England, assignors to Imperial Chemical Industries Limited, a corporation of Great Britain No Drawing. Application July 15, 1936, Serial No. 90,817. In Great Britain July 24, 1935

6 Claims. (Cl. 106—28)

This invention relates to plasters prepared from calcium sulphate hemihydrate, commonly known as plaster of Paris.

Calcium sulphate hemihydrate when gauged with water sets too rapidly to be capable of commercial use as a plaster or for the manufacture of moulded articles, and it is usual to retard its rate of setting by the addition of certain substances such as glue and borax.

We have now found that calcium salts of citric, malic and succinic acids, when added to calcium sulphate hemihydrate retard its rate of setting in the presence of water. The amount of the calcium salts required to retard the rate of setting sufficiently to render the hemihydrate useful as a plaster is small, and in general 0.1 to 1 per cent by weight, referred to the hemihydrate, will be found to be satisfactory.

The amount of retarder to be used depends upon the rate of setting required and may be as low as 0.02 per cent., for instance in the case of a casting plaster where a setting time of up to about 10 minutes is required. Water may be added in the usual proportions to obtain a mix of the desired consistency, from comparatively thick mixes for plastering purposes to very thin mixes suitable for casting.

As an illustration of the present invention, when a calcium sulphate hemihydrate without any addition of retarder was gauged with 50 per cent by weight of water, the set was complete in 8½ minutes. When 0.1 per cent by weight of calcium citrate, calcium malate or calcium succinate was added to the same hemihydrate and each of the mixtures was gauged as before with 50 per cent of water, the periods required to reach the initial set, as determined by the Vicat needle, were:

|  | Minutes |
|---|---|
| Calcium citrate | 33 |
| Calcium malate | 39 |
| Calcium succinate | 41 |

By way of comparison it may be mentioned that in the case of the corresponding potassium salts, the effect of which upon the setting of calcium sulphate hemihydrate has heretofore been described, the following times to reach the Vicat initial set were required, the proportions and conditions of use of the potassium salts being the same as for the calcium salts mentioned above:

|  | Minutes |
|---|---|
| Potassium citrate | 12 |
| Potassium malate | 7 |
| Potassium succinate | 5 |

The calcium salts of citric, malic and succinic acids are also stronger retarders for the setting of calcium sulphate hemihydrate than is calcium acetate, the admixture of which with plaster of Paris has already been proposed. Thus to obtain a retarded set of the order of 30–40 minutes, about 0.75 per cent. of calcium acetate is required compared with 0.1 per cent. of the said calcium salts.

It will be understood that the plaster or plaster mixes of the present invention may include inert constituents or fillers, e. g. sand or pumice, depending upon the purpose for which they are to be used. The principal application of the invention is to wall plasters but the mixes may be used for all purposes for which a material having the general properties of plaster of Paris is suitable. The properties of the set plaster of Paris are not affected by the use of the retarders of the invention in the amounts specified.

If desired the retarders of the present invention may be used in conjunction with known retarders, such as those previously mentioned.

We claim:—

1. A plaster or plaster mix consisting essentially of calcium sulphate hemihydrate together with a small proportion of a retarder selected from the class consisting of calcium citrate, calcium malate and calcium succinate.

2. A plaster or plaster mix as set forth in claim 1, in which the proportion of retarder is 0.1–1 per cent. by weight of the hemihydrate.

3. A plaster consisting of calcium sulphate hemihydrate admixed with about 0.1 per cent. by weight of calcium citrate.

4. A plaster consisting of calcium sulphate hemihydrate admixed with about 0.1 per cent. by weight of calcium malate.

5. A plaster consisting of calcium sulphate hemihydrate admixed with about 0.1 per cent. by weight of calcium succinate.

6. Plaster products consisting essentially of set calcium sulphate hemihydrate containing a small amount of a calcium salt selected from the class consisting of calcium citrate, calcium malate and calcium succinate.

FRANCIS R. HIMSWORTH.
JOHN STANLEY DUNN.